United States Patent [19]
Chometon et al.

[11] 3,960,031
[45] June 1, 1976

[54] COLLAPSIBLE STEERING COLUMNS

[75] Inventors: Alain Chometon; Georges Boquet, both of Boulogne-Billancourt, France

[73] Assignees: Regie Nationale des Usines Renault, Boulogne-Billancourt; Automobiles Peugeot, Paris, both of France

[22] Filed: Sept. 5, 1975

[21] Appl. No.: 610,823

[30] Foreign Application Priority Data
Sept. 11, 1974  France .............................. 74.30770

[52] U.S. Cl. .................................. 74/492; 188/1 C; 280/748
[51] Int. Cl.² ........................................... B62D 1/18
[58] Field of Search .................. 74/492; 280/150 B; 188/1 C; 180/82 C

[56] References Cited
UNITED STATES PATENTS

| | | | |
|---|---|---|---|
| 3,424,263 | 1/1969 | Black | 180/82 C |
| 3,472,093 | 10/1969 | Tenniswood | 74/492 |
| 3,477,307 | 11/1969 | Maddox | 74/492 |
| 3,760,649 | 9/1973 | Decouzon | 74/492 |
| 3,813,961 | 6/1974 | Hug | 74/492 |

*Primary Examiner*—Robert R. Song

[57] ABSTRACT

The invention relates to a collapsible device for the steering column of motor vehicles, which is adapted to recede in case of sudden and strong impact, comprising a pair of members normally assembled and interlocked through sliding surfaces, each member comprising on parallel sliding surfaces conjugate male and female contours, said members being retained in their locked condition by cementing same to each other under calibrated strength conditions, and further comprising means for securing them to separate sections of a steering column.

8 Claims, 4 Drawing Figures

COLLAPSIBLE STEERING COLUMNS

The present invention relates in general to steering columns of motor vehicles and has specific reference to a safety device for a steering column which is applicable more particularly to a steering column made of several sections disposed in relative alignment between the steering wheel and the steering gear box.

Steering columns for motor vehicles of which the shaft is adapted to collapse or recede in case of a strong shock applied to the front of the vehicle or when an abnormal pressure is exerted by the driver of the vehicle who is thrown forwards in case of crash, are already known.

A known proposition consisted in interposing between the steering wheel and the steering column a deformable member of which the resistance and distortion increase gradually. This member is adapted to absorb or damp out the shock of the driver's chest against the steering wheel and column, but it may become inoperative if in a front crash the shaft to which the steering wheel is attached is not disconnected from the steering gear mechanism during the first moments in which the same steering gear is caused to recede, this backward movement being most likely to destroy at least partially the shock absorbing member.

Another known proposition consisted in providing steering wheel shaft members or sections interconnected or coupled through an elastic member and driven by means of a pair of studs force fitted or embedded in said elastic member.

In a steering column construction comprising two Hooke's couplings or joints, this arrangement is objectionable owing to its instability when a torque is applied to the steering wheel. On the other hand, these elastic members have excessive overall dimensions in the space available in the vehicle for this purpose, and this may even prevent their use in the case of steering columns without Hooke's joints. It is also known to use two telescopically assembled steering column sections, but in certain cases this arrangement does not afford a sufficient stroke, considering the relative movements set up between the steering gear box and the steering column supporting bracket in case of crash, since these sections will abut prematurely against each other upon completion of their permissible stroke.

It is the essential object of the present invention to provide a satisfactory solution to the problem of disconnecting two sections of a steering column during the exertion of forces causing a movement of the steering gear box.

According to this invention, two sections of the steering column are interconnected through a collapsible sliding member adapted to enable both steering column sections to move away from each other in case an abnormally strong shock were applied to the steering wheel or to the steering gear box.

It is another object of this invention to provide a safety device capable of mutually guiding and separating the two sections of a steering column under a pedetermined load, whereby any increment in the load applied to one section will not affect the other section.

According to a preferred form of embodiment of the present invention, the collapsible device for interconnecting two sections of a steering column of a motor vehicle comprises two identical and symmetrical members adapted to slide in relation to each other and retain in mutual locking engagement by an injection of plastic cement, whereby the assembly is perfectly tight while affording a convenient taking up of any manufacturing play.

The invention will now be described more in detail with reference to the attached drawing illustrating diagrammatically by way of example a typical form of embodiment thereof. In the drawing.

Figure 1:
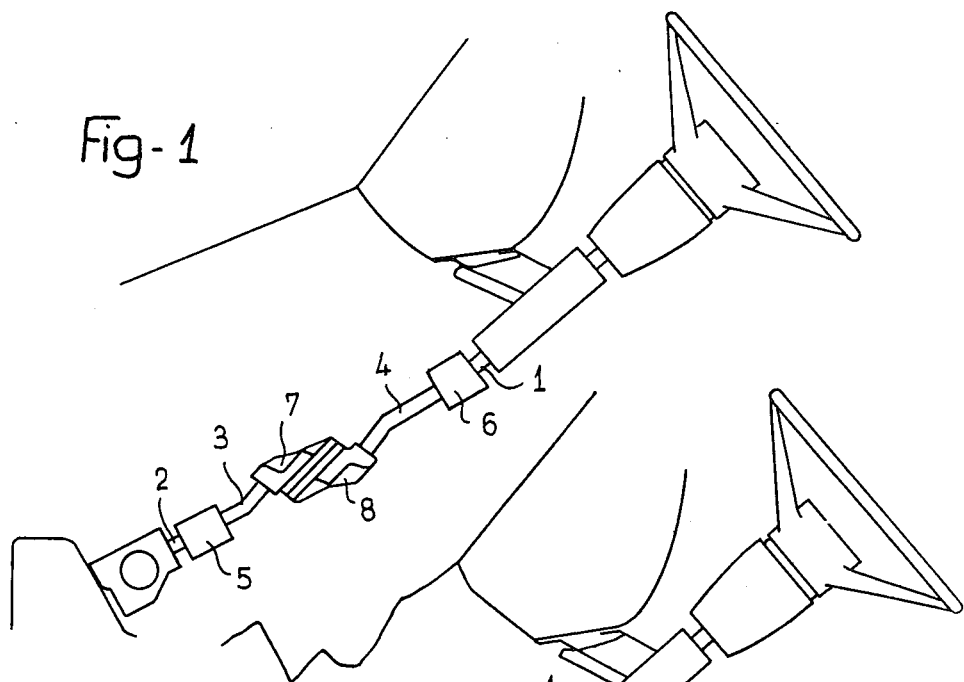
FIG. 1 is a side elevational view of a steering column provided with the collapsible device of this invention, shown in its operative position.
Figure 2:
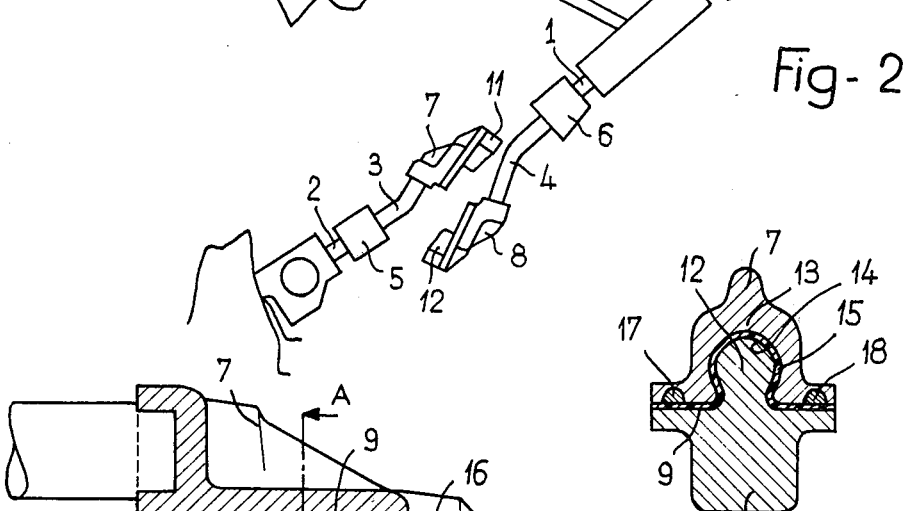
FIG. 2 is a view similar to FIG. 1, but showing the steering column in the condition obtained after a shock.

In the drawing, the steering column of a motor vehicle, which is illustrated by way of example, comprises three main sections, i.e. a steering wheel shaft 1, a bottom or lower shaft 2 operatively connected to the cross bar and a central shaft made of two sections 3 and 4. Each section 3, 4 is connected on the one hand, via couplings 5 and 6, to one of the shafts 1, 2 and on the other hand to the other section through the collapsible assembly proper consisting of two conjugate members 7, 8, each fitted to one of the corresponding section 3, 4 of the central shaft. These sections 3, 4 are mutually aligned, at least as far as the portions thereof connected via said couplings 5 and 6 to shaft 1 and 2 are concerned, whereas their ends connected to the relevant members 7, 8 of the collapsible assembly are bent in opposite directions while remaining parallel to each other, as shown. Thus, these ends provide a plane of symmetry in which the two members 7 and 8 are assembled.

Figure 3:
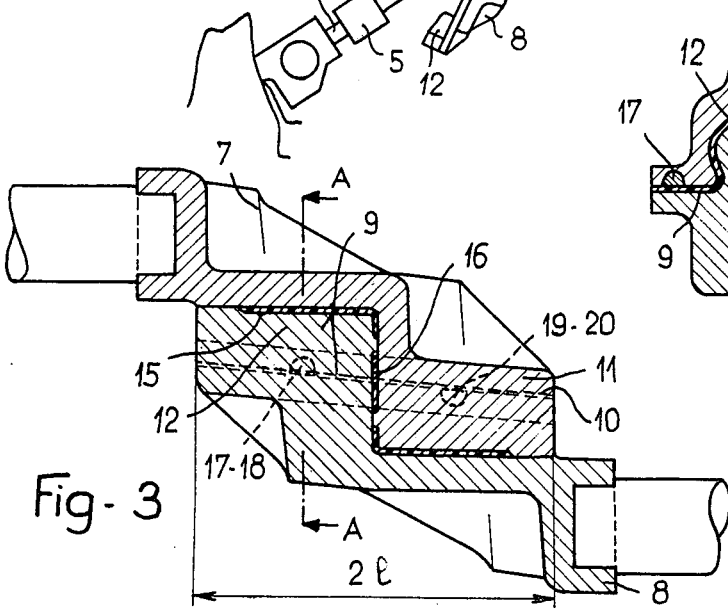
FIG. 3 is a longitudinal section showing on a larger scale a collapsible device according to this invention.
Figure 4:
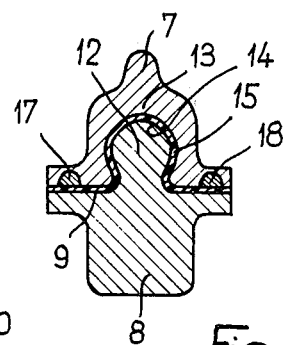
FIG. 4 is a section taken along the plane A—A of FIG. 3, but on a smaller scale.

These two members 7 and 8, illustrated more in detail in FIGS. 3 and 4, are metal castings having identical shapes and adapted to fit into each other. Each member 7, 8 has formed on its assembly surface a pair of steps 9, 10 supporting a male or female element of an interlocking system. These male and female elements have conjugate or matching rectilinear contours 13, 14 and their axis are coplanar with the general axis of the steering column. As shown in the cross sectional view of FIG. 4, these contours 13, 14 are omega-shaped, whether rounded or polygonal, and one contour is hollow and the other contour projects from the corresponding member. Each member 7, 8 comprises on the bearing portion thereof remotest from the shaft supporting it a projecting contour 11 or 12, whereas on the nearest bearing portion this contour is hollow and adapted to be engaged by the male contour of the conjugate or matching member.

It is clear that these conjugate or matching contours provide the necessary longitudinal guiding action in case of a shock and transmit the effort to the steering wheel both through their locking portions and through their flat portions. Any plays necessary for economically manufacturing the device is taken up by simply injecting a plastic cement 15 which also fills up the cavities 16 provided to this end. The longitudinal effort necessary for separating the two members 7, 8 is calibrated by properly selecting the plastic cement, or adding four cavities 17, 18, 19 and 20 into which the plastic cement is caused to flow during the injection, the plastic cement rods thus formed being sheared at their bases during a crash by the relative movements of said members 7 and 8, the shearing effort being calculated from the cross section area of these plastic cement rods.

After a proper relative movement the two members 7 and 8 are completely separated from each other.

The use of two identical members is advantageous in that the stroke available in case of crash is only one-half of the longitudinal dimension 2*l* of the mechanism assembly.

Although a specific form of embodiment of this invention has been described hereinabove with reference to the accompanying drawing, it will readily occur to those skilled in the art that various modifications and changes may be brough thereto without departing from the scope of the invention as set forth in the appended claims.

What is claimed as new is:

1. Collapsible device for the steering column of motor vehicles, adapted to be sunk when a sudden and strong pressure is exerted thereof, which comprises a pair of members having parallel sliding faces, wherein each one of said members comprises on its sliding face a locking contour, said locking contours being conjugate with each other and having a male and female configuration respectively, said members being retained in their normal locked condition by an injection of plastic cement of calibrated strength, said members further comprising means for securing same to relevant sections of a steering column.

2. Device according to claim 1, wherein each one of said members comprises two bearings carrying the one a longitudinal male contour and the other a longitudinal female contour conjugate with said male contour, whereby the collapse is obtained by causing a sliding movement corresponding to one-half of the total length of one member.

3. Device according to claim 1, wherein a clearance is provided between said male and female contours, thus permitting the interposition of a layer of plastic cement into said clearance.

4. Device according to claim 1, wherein one of the members or both is or are formed with cavities for receiving said plastic cement therein.

5. Device according to claim 1, wherein the surfaces in mutual contact of said members are inclined to the general axis of the steering column.

6. Device according to claim 1, wherein said contours have a substantially omega configuration in cross section.

7. Steering column comprising two sections having each secured at the end registering with the other section a collapsible device for the steering column of motor vehicles, adapted to be sunk when a sudden and strong pressure is exerted thereof, which comprises a pair of members having parallel sliding faces, wherein each one of said members comprises on its sliding face a locking contour, said locking contours being conjugate with each other and having a male and female configuration respectively, said members being retained in their normal locked condition by an injection of plastic cement of calibrated strength, said members further comprising means for securing same to relevant sections of a steering column.

8. Steering column according to claim 7, which further comprises a pair of couplings at the opposite ends of said sections.

* * * * *